(12) United States Patent
Kato et al.

(10) Patent No.: US 11,714,404 B2
(45) Date of Patent: Aug. 1, 2023

(54) BOARD PRODUCTION MANAGEMENT DEVICE AND BOARD PRODUCTION MANAGEMENT METHOD

(71) Applicant: FUJI CORPORATION, Chiryu (JP)

(72) Inventors: Daisuke Kato, Kuwana (JP); Yukitoshi Morita, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 694 days.

(21) Appl. No.: 16/319,512

(22) PCT Filed: Jul. 27, 2016

(86) PCT No.: PCT/JP2016/071983
§ 371 (c)(1),
(2) Date: Jan. 22, 2019

(87) PCT Pub. No.: WO2018/020594
PCT Pub. Date: Feb. 1, 2018

(65) Prior Publication Data
US 2021/0150446 A1 May 20, 2021

(51) Int. Cl.
*G05B 23/02* (2006.01)
*G05B 19/418* (2006.01)
(Continued)

(52) U.S. Cl.
CPC ..... *G05B 23/0283* (2013.01); *G05B 19/4184* (2013.01); *G05B 23/0216* (2013.01);
(Continued)

(58) Field of Classification Search
CPC combination set(s) only.
See application file for complete search history.

(56) References Cited

U.S. PATENT DOCUMENTS 5,293,048 A * 3/1994 Skunes ............... B23B 49/001
250/214 RC
5,607,097 A * 3/1997 Sato .................... B23K 1/0016
228/8
(Continued)

FOREIGN PATENT DOCUMENTS

| JP | 7-44226 A | 2/1995 |
| JP | 2007-123605 A | 5/2007 |
| JP | 2013-80291 A | 5/2013 |

OTHER PUBLICATIONS

Tomohiro, "Elevator Remote Maintenance Support System And Elevator Remote Maintenance Support Method", Jan. 24, 2019, German Patent and Trade Mark Office, DE 112016006842 T5, Machine Translation (Year: 2019).*
(Continued)

*Primary Examiner* — Crystol Stewart
(74) *Attorney, Agent, or Firm* — Oblon, McClelland, Maier & Neustadt, L.L.P.

(57) ABSTRACT

A board production management device configured to manage a board production line including an initial notification section configured to issue notification information including at least one of a contents of an error cause or a contents of countermeasures when the error cause that requires countermeasures occurs at the board production line; and an escalation notification section configured to issue the notification information after escalating in a case in which the error cause is not resolved after a specified time has elapsed since the error cause occurred. Accordingly, because when the specified time has elapsed, a notification is issued as escalating the notifyee or escalating the contents of countermeasures to resolve error causes more effectively, and compared to conventional technology in which only re-notification of the occurrence of the error cause is performed, notification is performed more efficiently, enabling (Continued)

an error cause that requires countermeasures to be resolved more quickly.

8 Claims, 5 Drawing Sheets

(51) Int. Cl.
    *G06Q 10/0631*     (2023.01)
    *G06Q 10/0633*     (2023.01)
    *G06Q 10/20*     (2023.01)
    *G06F 9/48*     (2006.01)

(52) U.S. Cl.
    CPC ....... *G06F 9/4843* (2013.01); *G06Q 10/0633* (2013.01); *G06Q 10/063114* (2013.01); *G06Q 10/20* (2013.01); *G05B 2219/31442* (2013.01); *G05B 2219/31447* (2013.01); *G05B 2219/31449* (2013.01); *G05B 2219/31452* (2013.01); *G05B 2223/06* (2018.08)

(56) References Cited

U.S. PATENT DOCUMENTS

| | | | | |
|---|---|---|---|---|
| 6,115,643 | A | 9/2000 | Stine et al. | |
| 6,832,341 | B1* | 12/2004 | Vijayan | G06F 11/0709 709/224 |
| 7,158,022 | B2* | 1/2007 | Fallon | G08B 13/19656 340/505 |
| 7,818,086 | B2 | 10/2010 | Awata et al. | |
| 8,219,663 | B2* | 7/2012 | Faraldo, II | H04L 41/00 709/224 |
| 2001/0037187 | A1* | 11/2001 | Kawahara | H05K 13/085 702/185 |
| 2002/0103569 | A1* | 8/2002 | Mazur | G05B 19/41805 700/216 |
| 2004/0201471 | A1* | 10/2004 | Primm | G08B 13/19671 340/506 |
| 2005/0204215 | A1* | 9/2005 | Tukiainen | H04L 41/16 714/712 |
| 2007/0067773 | A1* | 3/2007 | Hope | G06Q 10/06 718/100 |
| 2007/0139212 | A1* | 6/2007 | Kaundinya | G06Q 10/063114 340/692 |
| 2009/0009330 | A1* | 1/2009 | Sakama | G06K 19/04 340/572.1 |
| 2009/0120682 | A1* | 5/2009 | Ohtsuji | H01R 13/6658 174/359 |
| 2010/0131241 | A1* | 5/2010 | Dal Bello | G05B 23/02 709/219 |
| 2010/0325860 | A1* | 12/2010 | Maenishi | H05K 13/085 29/407.01 |
| 2014/0047064 | A1* | 2/2014 | Maturana | G05B 23/0221 709/217 |
| 2014/0156354 | A1* | 6/2014 | Bortolin | G06Q 10/0637 705/7.36 |
| 2015/0242263 | A1* | 8/2015 | Klose | G06Q 10/06 714/47.3 |
| 2015/0289386 | A1* | 10/2015 | Yamazaki | H05K 13/083 901/44 |
| 2016/0142541 | A1* | 5/2016 | Sharpe | G06Q 30/016 379/92.01 |
| 2017/0308963 | A1* | 10/2017 | Takehara | G06Q 10/063112 |
| 2018/0293533 | A1* | 10/2018 | Lowry | G06F 9/543 |
| 2019/0004501 | A1* | 1/2019 | Iisaka | G05B 19/4185 |
| 2020/0068759 | A1* | 2/2020 | Cvijetinovic | G06Q 10/06 |
| 2020/0214184 | A1* | 7/2020 | Kito | H05K 13/0409 |

OTHER PUBLICATIONS

Nakayama, "Production Line Monitoring Device", Apr. 3, 2014, World Intellectual Property Organization, WO 2014049872 A1, Machine Translation (Year: 2014).*

S. Härter, T. Klinger, J. Franke and D. Beer, "Comprehensive correlation of inline inspection data for the evaluation of defects in heterogeneous electronic assemblies," 2016 Pan Pacific Microelectronics Symposium (Pan Pacific), Big Island, HI, USA, 2016, pp. 1-6, doi: 10.1109/PanPacific.2016.7428408. (Year: 2016).*

International Search Report dated Sep. 13, 2016 in PCT/JP2016/071983 filed on Jul. 27, 2016.

* cited by examiner

FIG. 3

| Type of error cause | Item to escalate | Initial notification (when error cause occurs) | Escalation notification (when specified time T1 has elapsed) | Re-escalation notification (when second specified time T2 has elapsed) |
|---|---|---|---|---|
| Operating state of board production line | Authority level of notifyee | Technician | Line engineer | Floor manager |
| Drop in production management target<br>- Increase in pickup error rate<br>- Occurrence of defective board | Countermeasure contents | Countermeasures that do not change operating conditions | Countermeasures related to changing operating conditions | — |
| Normal work occurrence<br>- Run out of components<br>- Insufficient solder<br>- Changeover | Quantity of notifyees | Operator | Operator and sub-operator | Operator, sub-operator, and technician |

FIG. 4

| Display location | Display type | Initial display (when error cause occurs) | Escalation display (when specified time T1 has elapsed) | Re-escalation display (when second specified time T2 has elapsed) |
|---|---|---|---|---|
| Rolling tower rotating light | | Lit | Long interval flashing | Short interval flashing |
| Display device | | White characters on black background | Change to red characters | Increase size of characters |
| Email | Title | — | Add "urgent" | Add "very urgent" |
| | Importance level | Set to "normal" | Set to "high" | Set to "very high" |

FIG. 5

Error cause display list　　　　　　　　　　　　　Display time　11:40

| Error cause number | Error location | Error cause or contents of countermeasures | Occurrence time | Planned resolution time | Notification level |
|---|---|---|---|---|---|
| W21 | Component warehouse | Perform external changeover for the next production at line 2 | 9:00 | 9:30 | Complete |
| W11 | First line | An operating error has occurred at the first electronic component mounter | 9:20 | 9:50 | Complete |
| W22 | Second line | Perform changeover and start production | 10:10 | 10:40 | Complete |
| W12 | First line | The pickup error rate of the second electronic component mounter has worsened | 11:07 | 11:37 | Escalation notification |
| W13 | First line | The board production rate at the first line has dropped | 11:24 | 11:54 | Initial notification |

BOARD PRODUCTION MANAGEMENT DEVICE AND BOARD PRODUCTION MANAGEMENT METHOD

TECHNICAL FIELD

The present application relates to a board production management device configured to manage a board production line or a board production device, in particular it relates to a notification section configured to issue a notification of an occurrence of an error cause that requires manual countermeasures at the board production line or the board production device.

BACKGROUND ART

Equipment such as solder printers, electronic component mounters, reflow ovens, and board inspection machines are used as devices to produce boards mounted with many electronic components. Generally, these board production devices are connected to form a board production line. An operating state of the board production line is generally managed by a board production management device called a host computer. In a board production line, if an error cause occurs, such as an operating error of one of the board production devices, a failed inspection at the board inspection machine, or components running out at an electronic component mounter, manual countermeasures are required. In this case, the host computer issues a notification of the error cause to request that the manual countermeasures be performed. Such a notification of the occurrence of an error cause is disclosed in patent literature 1.

A plant monitoring device of patent literature 1 is provided with a warning occurrence display means for displaying the occurrence of an error state on a display device, and a re-warning output means that displays a warning display again on the display device after a specified time has elapsed since the error state occurred. Further, in descriptions of an embodiment it is disclosed that a display for the occurrence of an error state and a display for the occurrence of a re-warning state are different, for example, the error state being shown by a red display and the re-warning state being shown by a flashing red display. Accordingly, if the error state continues, when an appropriate time has elapsed, a re-warning display is shown to an operator, thus providing a plant monitoring device with high level of reliability.

CITATION LIST

Patent Literature

Patent literature 1: JP-A-H7-44226

BRIEF SUMMARY

Technical Problem

However, although a board production line may be considered to be a plant, using the technology of patent literature 1 it is difficult to perform an appropriate notification. For example, if a low-skilled operator receives the notification of the occurrence of the error cause, there may be a delay in the selection or performing of the appropriate countermeasures. Also, if the error cause is some complex situation of device operating errors or the like, an operator who is only used to performing normal component resupply work or changeover work may not know the appropriate countermeasures, or may not be authorized to perform the countermeasures. In such a case, it is desirable to issue a notification of the error cause to someone such as an engineer skilled in device operating errors or a process manager with a high level of authority. Also, because a specific operator working at a board production line may be very busy, they may not notice the notification, or may be temporarily unavailable, meaning that a long time may pass before countermeasures are performed. In these cases, production will be interrupted for a long time, leading to serious problems.

Accordingly, the technology of patent literature 1 in which a re-warning is issued after a specified time has elapsed after the occurrence of an error cause is not always appropriate for an error cause of a board production line. In other words, in a case in which the error cause is not resolved even after a specified time has elapsed after the occurrence of the error cause, it cannot be considered effective to simply perform a re-notification.

The present disclosure takes account of these problems and an object thereof is to provide a board production management device and a board production management method that enables error causes that require countermeasures to be resolved quickly by performing effective notification.

Solution to Problem

To solve the above problems, a board production management device of the disclosure is a board production management device configured to manage a board production line that produces boards mounted with electronic components or board production devices that configure the board production line, the board production management device including: an initial notification section configured to issue notification information including at least one of a contents of an error cause or a contents of countermeasures to a notifyee when the error cause that requires countermeasures occurs at the board production line or the board production device; and an escalation notification section configured to issue the notification information after escalating at least one of the notifyee or the contents of the countermeasures in a case in which the error cause is not resolved after a specified time has elapsed since the error cause occurred.

Also, a board production management method of the present disclosure is a board production management method for managing a board production line that produces boards mounted with electronic components or board production devices that configure the board production line, the board production management method including: an initial notification step of issuing notification information including at least one of a contents of an error cause or a contents of countermeasures to a notifyee when the error cause that requires countermeasures occurs at the board production line or the board production device; and an escalation notification step of issuing the notification information after escalating at least one of the notifyee or the contents of the countermeasures in a case in which the error cause is not resolved after a specified time has elapsed since the error cause occurred.

Advantageous Effects

In a board production management device of the present disclosure, when an error cause is not resolved even after a specified time has elapsed since the error cause occurred, the escalation notification section issues notification information after escalating at least one of the notifyee or the contents of the countermeasures. That is, when the specified time has elapsed, notification is performed such that the notifyee is escalated, or the contents of the countermeasures are escalated, for more effective resolving of the error cause. Accordingly, compared to conventional technology in which re-notification of the occurrence of the error cause is performed, notification is performed more efficiently, enabling an error cause that requires countermeasures to be resolved more quickly.

Also, in a board production management method of the present disclosure, similar to the board production management device of the present disclosure, when a specified time has elapsed since an error cause occurred, notification is performed such that the notifyee is escalated, or the contents of the countermeasures are escalated, for more effective resolving of the error cause. Accordingly, compared to conventional technology in which re-notification of the occurrence of the error cause is performed, notification is performed more efficiently, enabling an error cause that requires countermeasures to be resolved more quickly.

BRIEF DESCRIPTION OF DRAWINGS

FIG. 3 is a table with types of error causes and corresponding escalation items.

FIG. 4 is a table showing contents of an initial display, an escalation display, and a re-escalation display of the display section.

FIG. 5 is an example of a screen of a display device to illustrate a display function of a list display section.

DESCRIPTION OF EMBODIMENTS

Figure 1:
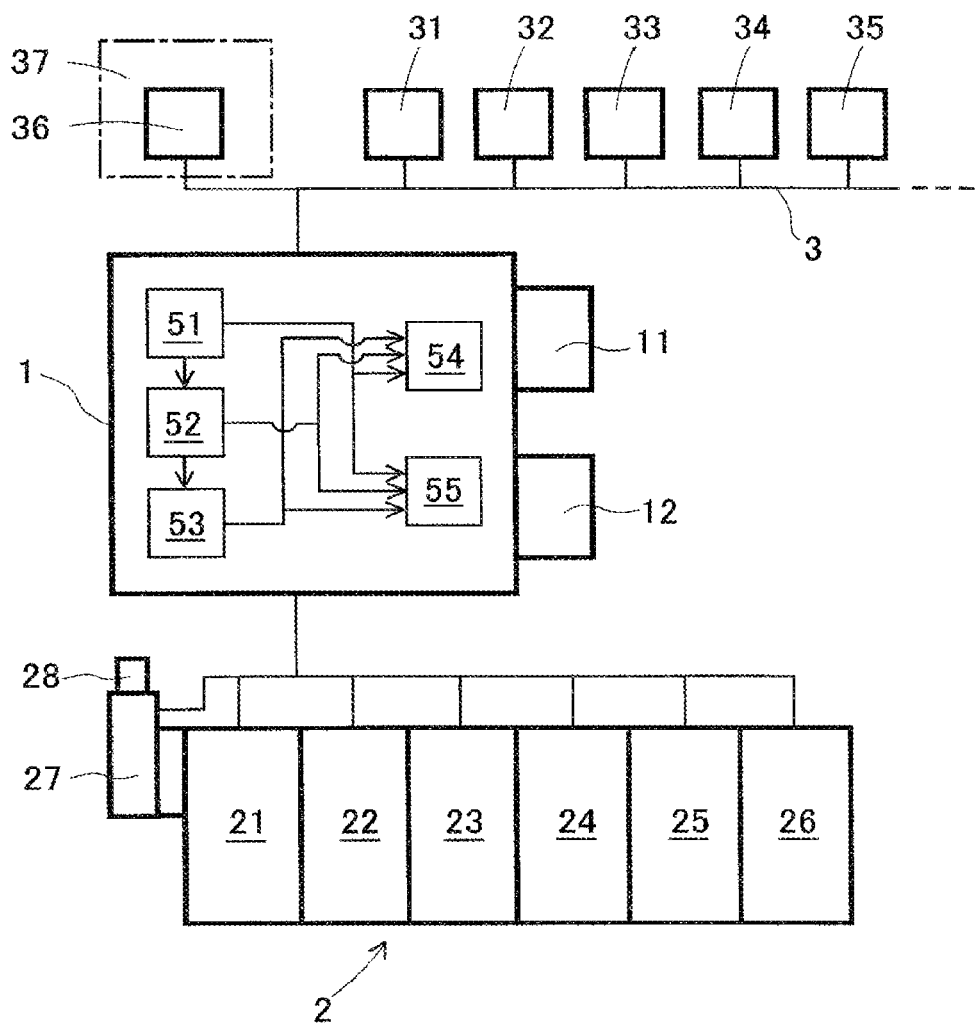
FIG. 1 schematically shows the configuration of a board production management device of an embodiment along with a board production line.

1. Configuration of Board Production Management Device 1 and Board Production Line 2 of an Embodiment Board production management device 1 of an embodiment of the present disclosure will be described with reference to FIGS. 1 to 5. FIG. 1 schematically shows the configuration of board production management device 1 of an embodiment along with board production line 2. Board production line 2 is configured from six board production devices. Specifically, board production line 2 is configured from solder printer 21, solder inspection machine 22, first electronic component mounter 23, second electronic component mounter 24, board appearance inspection machine 25, and reflow oven 26.

Solder printer 21 prints solder paste onto specified positions of a board. Solder printer 21, for example, is configured from items such as a board conveyance device, a stencil to be loaded on the board, and a squeegee moved above the stencil to print the solder. Solder inspection machine 22 determines whether the printed state of the solder on the board is good. Solder inspection machine 22, for example, is configured from items such as a board conveyance device, a camera that captures an image of the printed solder to acquire image data, and an image determination section to image process the image data to determine whether the printed state of the solder is good.

First electronic component mounter 23 and second electronic component mounter 24 mount electronic components on the board. Electronic component mounters 23 and 24 may have the same configuration or a different configuration. Electronic component mounters 23 and 24, for example, are configured from items such as a board conveyance device, a component supply device, and a component transfer device. The component supply device may be configured from, for example, multiple feeder type devices that use carrier tape that holds many electronic components, or a tray type device that uses trays on which multiple electronic components are loaded in a grid. The component transfer device includes items such as a mounting head that picks up and holds electronic components using a suction nozzle and a head driving mechanism. The component transfer device picks up electronic components from the component supply device and mounts them on the solder on the board.

Board appearance inspection machine 25 inspects the state of electronic components mounted on the board. Board appearance inspection machine 25, for example, is configured from items such as a board conveyance device, a camera that captures an image of the electronic components to acquire image data, and an image determination section to image process the image data to determine whether the state of the electronic components is good. Reflow oven 26 is for completing the solder connections by melting the solder paste and then cooling it. Reflow oven 26, for example, is configured from items such as a board conveyance device, a heating device, and a cooling device.

The configuration of the above board production line 2 may be changed, and the configuration of each board production device may be changed. Rolling tower 27 is attached to board production line 2. Rolling tower 27 displays when manual countermeasures are required at board production line 2. That is, when countermeasures become necessary, rolling tower 27 causes rotating light 28 on an upper section of rolling tower 27 to light up or flash while rotating. An operator on the same floor as board production line 2 can see the lit up or flashing rotating light 28 even from a distance.

Board production management device 1 of an embodiment manages an operating state of board production line 2. Board production management device 1 is a computer with a CPU that runs software and is also known as a host computer. Board production management device 1 is provided with items such as display device 11 such as a liquid crystal display for displaying various items, input device 12 such as a keyboard and mouse for specifying various settings, and a memory device, which is not shown. Board production management device 1 is connected to solder printer 21, solder inspection machine 22, first electronic component mounter 23, second electronic component mounter 24, board appearance inspection machine 25, and reflow oven 26 such that individual communication with each is possible. Board production management device 1 is also connected to rolling tower 27 and controls the display of rolling tower 27. Board production management device 1 may also manage multiple board production lines all together.

Board production management device 1 issues a notification when an error cause that requires countermeasures occurs at board production line 2. There are three main types of error causes that require countermeasures: operation errors, dropping below a production management target, and normal work. Operation errors refer to a state in which boards cannot be produced at board production line 2. Examples of operation errors include a state of continuous pickup errors in which electronic components cannot be picked up at electronic component mounters 23 or 24, a state in which inspection cannot be performed at solder inspection machine 22 or board appearance inspection machine 24, or a state in which boards cannot be conveyed.

Dropping below a production management target refers to a state in which production efficiency has worsened, even if boards can still be produced at board production line 2. Examples of dropping below a production management target include a decrease in the operating rate, an increase in the pickup error rate at electronic component mounter 23 or 24, or a board that fails inspection at solder inspection machine 22 or board appearance inspection machine 25. Normal work is work that needs to be performed normally while boards are being produced at board production line 2. Examples of normal work are component replenishment work that arises when electronic components run out at component mounters 23 and 24, solder replenishment work at solder printer 21, and changeover work that arises when the type of board being produced changes.

Board production management device 1 includes, as a functional section for notifying and displaying when an error cause occurs, initial notification section 51, escalation notification section 52, re-escalation notification section 53, display section 54, and list display section 55. Detailed functions of these functional sections are described later when operation and effects are described.

Further, board production management device 1 is connected to multiple computers 31 to 36 via internal LAN 3 such that communication is possible. First computer 31 is used by an operator largely working at board production line 2. An operator is in charge of performing normal work at board production line 2. Second computer 32 is used by a sub-operator who supports work at board production line 2. A sub-operator assists with operator work, and performs normal work instead of an operator when the operator is absent. A sub-operator may be a dedicated worker or may also work as an operator for an adjacent board production line.

Third computer 33 is used by a technician who has a higher level of proficiency or more experience with respect to operation errors of board production line 2. Fourth computer 34 is used by a line engineer who is responsible for board production line 2. Fifth computer 35 is used by a floor manager who is responsible for the entire floor including other board production lines in addition to board production 2. Sixth computer 36 is provided inside material warehouse 37 and is used by someone who performs specified changeover work. Notifications can be issued between board production management device 1 computers 31 to 36 and between computers 31 to 36 themselves via emails sent to a specified email address.

For resolving operation errors at board production line 2, a technician has a low authority level capable of changing a portion of the operating conditions of board production line 2. A line manager has a medium authority level capable of changing many operating conditions of board production line 2. A floor manager has a high authority level capable of changing any of the operating conditions of board production line 2. Operators and sub-operators do not have authority to change operating conditions of board production line 2. However, operators and sub-operators can perform countermeasures that do not require any changes to operating conditions.

Examples of operating conditions of board production line 2 include items that apply to the entire board production line 2 such as the conveyance speed of boards, and settings related to position references when stopping boards. Also, for solder printer 21, operating conditions include solder management methods and squeegee control methods. For electronic component mounters 23 and 24, operating conditions include component data of the electronic components, coordinate data of the pickup positions, control methods for the raising and lowering speed and negative pressure of suction nozzles, and the moving speed of the mounting head. For solder inspection machine 22 and board appearance inspection machine 25, operating conditions include an imaging method, image processing specifications, and pass-fail determination criteria. Because changing operating conditions may affect the operating state of board production line 2, it is desirable that such changes be performed by someone with at least one of a high level of skill, a lot of experience, or a high authority level.

As for countermeasures that do not require changing operating conditions, these include visually checking the location at which an error cause occurs, exchanging suction nozzles or feeders of electronic component mounters 23 and 24, and checking image data related to solder inspection machine 22 and board appearance inspection machine 25. Such countermeasures are relatively easy to perform and do not affect the operating rate of board production line 2.

Figure 2:
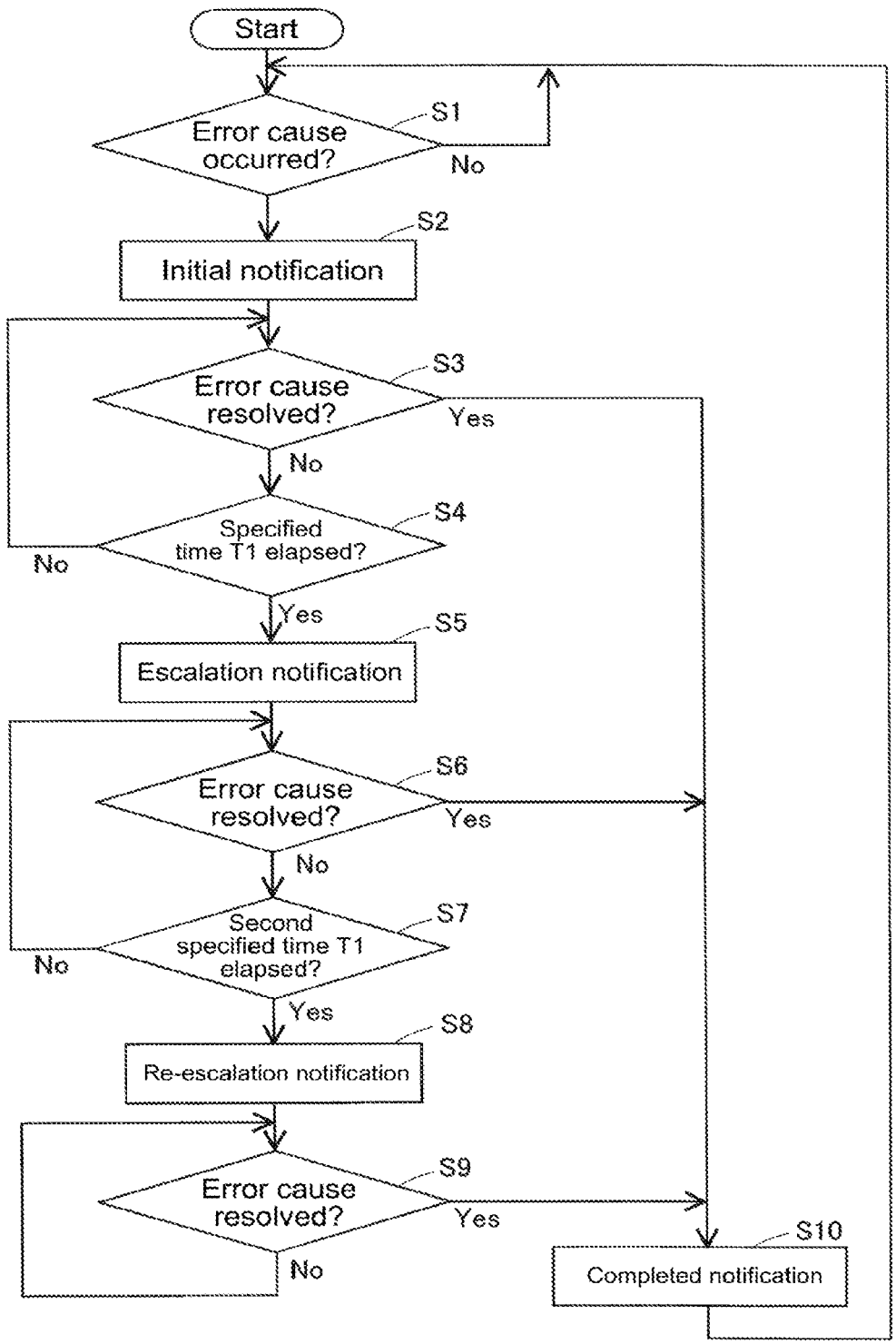
FIG. 2 is a flowchart showing operation of the board production management device of the embodiment.

2. Operations and Effects of Board Production Management Device 1 of an Embodiment Turning now to operations and effects of board production management device 1 of an embodiment. FIG. 2 is a flowchart showing operation of board production management device 1 of the embodiment. Descriptions related to FIG. 2 given below also apply to a board production management method of the embodiment. In S1 of FIG. 2, initial notification section 51 determines whether an error cause has occurred at board production line 2. Initial notification section 51 repeatedly performs S1 until an error cause occurs, at which point processing proceeds to initial notification S2.

In initial notification S2 initial notification section 51 issues notification information including at least one of contents of an error cause or contents of countermeasures to a notifyee. This notification and other notifications described later are performed via email. Contents of the notification by initial notification section 51 are sent to escalation notification section 52 and transferred to display section 54 and list display section 55. In S3, escalation notification section 52 determines whether the error cause has been resolved. If the error cause has been resolved, escalation notification section 52 proceeds to S10; if the error cause has not been resolved, escalation notification section 52 proceeds to S4.

In S4, escalation notification section 52 determines whether specified time T1 has elapsed since the occurrence of the error cause. Specified time T1 is a time roughly based on the progress of countermeasures and is set to, for example, 30 minutes regardless of the type of error cause. Escalation notification section 52 repeatedly performs S3 and S4 until specified time T1 has elapsed, then processing proceeds to escalation notification S5.

In escalation notification S5, escalation notification section 52 issues notification information after escalating at least one of the notifyee or the contents of the countermeasures. Contents of the notification by escalation notification section 52 are sent to re-escalation notification section 53 and transferred to display section 54 and list display section 55. In S6, re-escalation notification section 53 determines whether the error cause has been resolved. If the error cause has been resolved, re-escalation notification section 53 proceeds to S10; if the error cause has not been resolved, re-escalation notification section 53 proceeds to S7.

In S7, re-escalation notification section 53 determines whether specified time T2 has elapsed since the occurrence of the error cause. Specified time T2 is longer than specified time T1 and is a time roughly based on the progress of countermeasures and is set to, for example, 60 minutes regardless of the type of error cause. Re-escalation notification section 53 repeatedly performs S6 and S7 until specified time T2 has elapsed, then processing proceeds to re-escalation notification S8.

In re-escalation notification S8, re-escalation notification section 53 issues notification information after escalating at least one of the notifyee or the contents of the countermeasures. Contents of the notification by re-escalation notification section 53 are transferred to display section 54 and list display section 55. In S9, board production management device 1 determines whether the error cause has been resolved. If the error cause has been resolved, board production management device 1 proceeds to S10; if the error cause has not been resolved, board production management device 1 repeats S9.

When the error cause is resolved due to countermeasures being performed, board production line 2 restarts operation and notifies board production management device 1 of the restart. Also, someone who completes countermeasures in material warehouse 37 notifies that fact to board production management device 1 from sixth computer 36. Thus, board production management device 1 is able to recognize that the error cause has been resolved and proceed to S10. In S10, board production management device 1 issues a notification to the notifyee that countermeasures have been completed. In a case in which multiple error cause overlap, board production management device 1 performs the processing flow of FIG. 2 individually for each of the error causes.

Here, items to be escalated by escalation notification section 52 and re-escalation notification section 53 change depending on the type of error cause. FIG. 3 is a table with types of error causes and corresponding escalation items. With operation errors of board production line 2 shown in the second row of FIG. 3, the authority level of the notifyee who is notified of the error cause is escalated. In detail, initial notification section 51 performs notification to third computer 33 with a technician as the notifyee. Escalation notification section 52 performs notification to fourth computer 34 with a line engineer as the notifyee. The fact that the line engineer has been notified is also notified to the technician. Re-escalation notification section 53 performs notification to fifth computer 35 with a floor manager as the notifyee. The fact that the floor manager has been notified is also notified to the technician and the line engineer.

In this manner, with respect to operating errors, as time elapses, the authority level of the notifyee increases. Accordingly, a technician with a low level of authority does not have to handle problems of resolving error causes by themselves for a long time, the problems are shared with a line engineer with a medium level of authority and a floor manager with a high level of authority. Accordingly, the urgency of the problem can be understood reliably and quickly, and multiple people can contribute to resolving the problem. Further, options for changing operating conditions of board production line 2 increase, meaning that error causes due to operating errors can be resolved quickly.

With the dropping below a production management target displayed in the third row of FIG. 3, the notifyee is fixed as an operator or technician, and notification is performed to first computer 31 and third computer 33. Then, the contents of the countermeasures that are notified are escalated. In detail, initial notification section 51 issues a notification of countermeasures without changing operating conditions. Escalation notification section 52 issues a notification of countermeasures related to changing operating conditions.

In this manner, with respect to a dropping below a production management target, countermeasures are suggested in order from relatively easy countermeasures that can be performed by an operator to high-level countermeasures that require the higher authority level of a technician. Accordingly, multiple countermeasures can be performed in order in an effective manner so as to recover from the drop below the production management target with little effort.

Further, when normal work arises as shown in row 4 of FIG. 3, the quantity of notifyees notified about the error cause can is increased. In detail, initial notification section 51 performs notification to first computer 31 with an operator as the notifyee. Escalation notification section 52 performs notification to first computer 31 and second computer 32 with an operator and a sub-operator as the notifyee. Re-escalation notification section 53 performs notification to first computer 31, second computer 32, and third computer 33 with an operator, a sub-operator, and a technician as the notifyee.

In this manner, with respect to normal work, the quantity of notifyees increases as time elapses. Accordingly, if an operator does not notice the notification due to being busy or is away from the line, a sub-operator can respond. If both the operator and sub-operator cannot respond, a technician can respond. Accordingly, the urgency in a delay of normal work can be understood reliably and quickly, meaning that normal work is performed quickly, interruptions to production do not occur, or even if interruptions do occur, they do not last long.

3. Functions and Operation of Display Section 54 and List Display Section 55.

Described next are functions and operation of display section 54. Display section 54 synchronizes with operation of initial notification section 51 and performs initial display of displaying the fact that an error cause has occurred. Further, display section 54 synchronizes with operation of escalation notification section 52 and performs escalated display with the display contents escalated compared to the initial display. Further, display section 54 synchronizes with operation of re-escalation notification section 53 and performs re-escalated display with the display contents escalated compared to the escalated display. As a location for display section 54 to display the initial display, the escalated display, and the re-escalated display, for example, rolling tower 27, display device 11, or information attached to an email may be used.

FIG. 4 is a table showing contents of an initial display, an escalation display, and a re-escalation display of the display section 54. As shown in the table, display section 54 causes rotating light 28 of rolling tower 27 to be lit in the initial display, to flash with a long interval in the escalation display, and to flash with a short interval in the re-escalation display. Also, display section 54, for the display of display device 11, displays white characters on a black background in the initial display, changing to red characters in the escalation display, and increasing the character size in the re-escalation display.

Further, display section 54, for the title of the emails, adds nothing in the initial display, adds "urgent" in the escalation display, and adds "very urgent" in the re-escalation display. Also, display section 54, for the importance level set in the emails, set "normal" in the initial display, sets "high" in the escalation display, and sets "very high" in the re-escalation display.

In this manner, display section 54 synchronizes with the notifications to jointly use each display and escalates the displays contents. Accordingly, display section 54 clearly and easily informs a notifyee of the importance level of an error cause for which the resolving of is delayed.

Described next are functions and operation of list display section 55. List display section 55 manages multiple board production lines and displays notification information related to error causes at all sections that are currently occurring together with the operating state of escalation notification section. List display section 55, as a location for the list display, may use at least one of display device 11 or computers 31 to 36. FIG. 5 is an example of a screen of display device 11 to illustrate a display function of list display section 55. In the example screen of FIG. 5, two board production lines 1 are shown, a first line and a second line. In the example screen of FIG. 5, five error causes are displayed in order of occurrence time.

In the list displayed in FIG. 5, there are six columns: error cause number, occurrence location, error cause or contents of countermeasures, occurrence time, planned resolution time, and notification level. Further, the first error cause, W21, occurred at 9:00. The contents of error cause W21 are displayed as countermeasures of "Perform external changeover for the next production at line 2". Then, external changeover work is performed at material warehouse 37. In detail, the quantity of boards produced at the second line is nearing the target quantity, and soon changeover work for a different type of board will be required. Thus, it is requested to prepare feeder devices and the like to use in the next production in material warehouse 37.

The planned finish time for external changeover is displayed as 9:30 in the planned resolution time column. In the present embodiment, the planned resolution time is set automatically as specified time T1 (=30 minutes) after the occurrence. With regard to external changeover, the fact that it is already finished before current time 11:40 is notified from sixth computer 36 to board production management device 1. Accordingly, in the notification level column, "complete" means that the completed notification for S10 of FIG. 2 has been performed.

The second error cause, W11, occurs at 9:20. Error cause W11 occurred at the first line, and the contents are "An operating error has occurred at the first electronic component mounter". Error cause W11 has already been resolved, so "complete" is displayed.

The third error cause, W22, occurred at 10:10. Error cause W22 occurred at the second line and is displayed by the countermeasures of "Perform changeover and start production". This means that the quantity of boards produced at the second line has reached the target quantity, and changeover is required for a different type of board. Error cause W22 has also already been resolved and the next production has been started, so "complete" is displayed.

The fourth error cause, W12, occurred at 11:07. Error cause W12 occurred at the first line, and the contents are "The pickup error rate of the second electronic component mounter has worsened". In accordance with the occurrence of error cause W12, initial notification section 51 is operated at the occurrence time of 11:07 and initial notification S2 is performed. Error cause W12 has not been resolved as of planned resolution time 11:37, that is, after specified time T1 (=30 minutes) has elapsed. Accordingly, escalation notification section 52 is operated and escalation notification S5 is performed. Further, error cause W12 is still not resolved at 11:40. Therefore, in the notification level column, "escalation notification" means that escalation notification S5 has been performed.

The fifth error cause, W13, occurred at 11:24. Error cause W13 occurred at the first line, and the contents are "The board production rate at the first line has dropped". In accordance with the occurrence of error cause W13, initial notification section 51 is operated at the occurrence time of 11:24 and initial notification S2 is performed. However, error cause W13 is still not resolved at 11:40. Therefore, in the notification level column, "initial notification" means that initial notification S2 has been performed. Assuming a case in which the error cause has still not been resolved even after the second specified time T2 (=60 minutes) has elapsed from the occurrence of the error cause, "re-escalation notification" will be displayed in the notification level column.

In this manner, list display section 55 displays notification information related to all of the current error causes together with the operating state of initial notification section 51, escalation notification section 52, and re-escalation notification section 53. Thus, a state in which error causes continue for a long time is displayed in a list that can be checked visually, and the occurrence length and urgency level of error causes can be understood reliably and easily.

4. Applications and Effects of Board Production Management Device 1 of an Embodiment.

Board production management device 1 of an embodiment is configured to manage board production line 2 that produces boards mounted with electronic components and includes: initial notification section 51 configured to issue notification information including at least one of a contents of an error cause or a contents of countermeasures to a notifyee when the error cause that requires countermeasures occurs at board production line 2; and escalation notification section 52 configured to issue the notification information after escalating at least one of the notifyee or the contents of the countermeasures in a case in which the error cause is not resolved after specified time T1 has elapsed since the error cause occurred.

Accordingly, when an error cause is not resolved even after specified time T1 has elapsed since the error cause occurred, escalation notification section 52 issues notification information after escalating at least one of the notifyee or the contents of the countermeasures. That is, when specified time T1 has elapsed, notification is performed such that the notifyee is escalated, or the contents of the countermeasures are escalated, for more effective resolving of the error cause. Accordingly, compared to conventional technology in which re-notification of the occurrence of the error cause is performed, notification is performed more efficiently, enabling an error cause that requires countermeasures to be resolved more quickly.

Further, escalation notification section 52 is configured to issue the notification information to a different notifyee who has at least one of a higher level of proficiency or more experience related to resolving the error cause or a higher authority level than the notifyee who was notified by initial notification section 51. For example, when an operating error occurs at board production line 2, initial notification section 51 issues a notification to a technician with a low authority level, and escalation notification section 52 issues a notification to a line engineer with a medium authority level.

Accordingly, a technician with a low level of authority does not have to handle problems of resolving error causes by themselves for a long time, the problems are shared with a line engineer with a medium level of authority. Therefore, the urgency of the problem can be understood reliably and quickly, and multiple people can contribute to resolving the problem. Further, options for changing operating conditions of board production line 2 increase, meaning that error causes due to operating errors can be resolved quickly.

Also, escalation notification section 52 issues notification information to a larger quantity of notifyees than a quantity notified by initial notification section 51. For example, when an operating error occurs at board production line 2, initial notification section 51 issues notification to an operator, and escalation notification section 52 issues notification to an operator and a sub-operator.

In this manner, the quantity of notifyees increases as time elapses. Accordingly, if an operator does not notice the notification due to being busy or is away from the line, a sub-operator can respond. Thus, the urgency in a delay of normal work can be understood reliably and quickly, meaning that normal work is performed quickly, interruptions to production do not occur, or even if interruptions do occur, they do not last long.

Further, initial notification section 51 issues notification information including countermeasures that do not change the operating conditions of board production line 2, and escalation notification section 52 issues notification information including countermeasures related to changing operating conditions. For example, if production drops below a production management target at board production line 2, notifyees are fixed as an operator and a technician, initial notification section 51 issues a notification of countermeasures that do not change operating conditions, and escalation notification section 52 issues a notification of countermeasures related to changing operating conditions.

Thus, contents of countermeasures are displayed in order from relatively easy countermeasures that can be performed by an operator to high-level countermeasures that require the higher authority level of a technician. Accordingly, multiple countermeasures can be performed in order in an effective manner so as to recover from the drop below the production management target with little effort.

Further, board production management device according of an embodiment further includes display section 54 configured to synchronize with operation of initial notification section 51 and display an initial display indicating that an error cause had occurred, and to synchronize with operation of escalation notification section 52 and display an escalation display, display contents of the escalation display being escalated compared to the initial display. Accordingly, display section 54 clearly and easily informs a notifyee of the importance level of an error cause for which the resolving of is delayed.

Further, board production management device 1 of an embodiment is provided with re-escalation section 53 configured to, in a case in which the error cause has not been resolved after second specified time T2 that is longer than specified time T1 has elapsed since the error cause occurred, issue the notification information after escalating at least one of the notifyee or the contents of the countermeasures even further than the escalation of escalation notification section 52. Accordingly, escalation of least one of the notifyee or the contents of the countermeasures can be performed across multiple levels, enhancing the above effects.

Further, board production management device 1 of an embodiment is configured to manage multiple of the board production lines or multiple of the board production devices and further includes list display section 55 configured to display each of the notification information related to all of the error causes currently occurring along with an operating state of escalation notification section 52. Accordingly, a state in which error causes continue for a long time is displayed in a list that can be checked visually, and the occurrence length and urgency level of error causes can be understood reliably and easily.

Also, a board production management method of an embodiment is for managing board production line 2 that produces boards mounted with electronic components and includes: initial notification section S2 issuing notification information including at least one of a contents of an error cause or a contents of countermeasures to a notifyee when the error cause that requires countermeasures occurs at board production line 2; and escalation notification S5 for issuing the notification information after escalating at least one of the notifyee or the contents of the countermeasures in a case in which the error cause is not resolved after specified time T1 has elapsed since the error cause occurred.

Accordingly, similar to board production management device 1 of an above embodiment, when specified time T1 has elapsed since an error cause occurred, notification is performed such that the notifyee is escalated, or the contents of the countermeasures are escalated, for more effective resolving of the error cause. Accordingly, compared to conventional technology in which re-notification of the occurrence of the error cause is performed, notification is performed more efficiently, enabling an error cause that requires countermeasures to be resolved more quickly.

5. Applications and Alternative Embodiments

Note that, board production management device 1 of an embodiment manages an entire board production line 2, but the configuration is not limited to this. In other words, board production management device 1 may be configured to manage a portion of the board production devices that configure board production line 2, for example, only electronic component mounters 23 and 24. Also, computers 31 to 36 may be mobile terminals connected by wireless communication. Further, specified time T1 and second specified time T2 may be variable depending on different types of error causes. And, the display contents of display section 54 and list display section 55 described above are simply examples, various display methods for displaying escalation may be applied. Various other applications and modifications are possible for the present disclosure.

REFERENCE SIGNS LIST

1: board production management device; 11: display device; 2: board production line; 21: solder printer; 22: solder inspection machine; 23: first electronic component mounter; 24: second electronic component mounter; 25: board appearance inspection machine; 26: reflow oven; 27: rolling tower; 31 to 36: first to sixth computer; 51: initial notification section; 52: escalation notification section; 53: re-escalation notification section; 54: display section; 55: list display section

The invention claimed is:

1. A board production management device configured to manage a board production line including board production devices that produce boards mounted with electronic components, the board production management device comprising:

a display including at least one of a display screen and a display light; and a processor connected via a network to each of the board production devices and configured to determine that an error has occurred at the board production line;

issue an initial notification to a first notifyee via the display of the error at the board production line to the display, the initial notification including a contents of an error cause and a contents of first countermeasures to the error cause, the first countermeasures not changing operating conditions of the board production line or the board production devices, and the error cause being a continuous pickup error in which the electronic components cannot be picked up by an electronic component mounter of the board production line; and issue an escalation notification of the error to the first notifyee and a second notifyee that has a higher level of authority or proficiency related to resolving the error cause than the first notifyee via the display in a case in which the error cause is not resolved after a first specified time has elapsed since the error occurred, the escalation notification including second countermeasures to the error cause that are escalated relative to the first countermeasures, and the second countermeasures changing the operating conditions which include modifying at least one of pickup positions of electronic components, raising and lowering speed of suction nozzles, negative pressure of the suction nozzles, and a moving speed of a mounting head.

2. The board production management device according to claim 1, wherein
the display is configured to synchronize the initial notification and display an initial display indicating that the error cause had occurred, and to synchronize with the escalation and display an escalation display, display contents of the escalation display being escalated compared to the initial display.

3. The board production management device according to claim 1, wherein the processor is further configured to
issue a re-escalation notification via the display in a case in which the error cause has not been resolved after a second specified time longer than the first specified time has elapsed since the error cause occurred, issue the re-escalation notification after escalating at least one of a number of notifyees and the contents of the countermeasures greater than that of the escalation notification.

4. The board production management device according to claim 1, wherein
the board production management device is configured to manage multiple of the board production lines or multiple of the board production devices, and
the display screen includes a list display configured to display notification information related to all of the error causes currently occurring.

5. The board production management device according to claim 4, wherein
the list display includes an occurrence location of the error, the error cause, the contents of the first countermeasure, an occurrence time, and a notification level.

6. The board production management device according to claim 1, wherein
the error cause is one of a plurality of error causes that overlap in time, the initial notification and the escalation notification evaluated for each of the multiple error causes,
the board production line is one of a plurality of board production lines,
the processor further configured to
display the plurality of error causes in order of time of occurrence, and
display each piece of notification information related to all of currently occurring error causes together with an operation status of the escalation notification step.

7. A board production management method for managing a board production line including board production devices that produce boards mounted with electronic components, the board production management method comprising:
determining that an error has occurred at the board production line;
an initial notification step of issuing an initial notification of the error at the board production line to a first notifyee via a display that includes at least one of a display screen and a display light, the initial notification including at least one of a contents of an error cause and a contents of first countermeasures to the error cause, the error cause being a continuous pickup error in which the electronic components cannot be picked up by an electronic component mounter of the board production line, and the first countermeasures do not change operating conditions of the board production line or the board production devices, and; and
an escalation notification step of issuing an escalation notification of the error to the first notifyee and a second notifyee that has a higher level of authority or proficiency related to resolving the error cause than the first notifyee via the display in a case in which the error cause is not resolved after a specified time has elapsed since the error occurred, the escalation notification including second countermeasures to the error cause that are escalated relative to the first countermeasures, and the second countermeasures change the operating conditions which include modifying at least one of pickup positions of electronic components, raising and lowering speed of suction nozzles, and negative pressure of the suction nozzles.

8. The board production management method according to claim 7, wherein
the error cause is one of a plurality of error causes that overlap in time, the initial notification and the escalation notification evaluated for each of the multiple error causes,
the board production line is one of a plurality of board production lines,
the method further comprising
displaying the plurality of error causes in order of time of occurrence, and
displaying each piece of notification information related to all of currently occurring error causes together with an operation status of the escalation notification step.

* * * * *